(12) United States Patent
Purdey

(10) Patent No.: US 11,441,478 B2
(45) Date of Patent: Sep. 13, 2022

(54) WASTEGATE FOR TURBINE

(71) Applicant: CUMMINS LTD, London (GB)

(72) Inventor: Matthew J. Purdey, Huddersfield (GB)

(73) Assignee: CUMMINS LTD., Huddersfield (GB)

( * ) Notice: Subject to any disclaimer, the term of this patent is extended or adjusted under 35 U.S.C. 154(b) by 0 days.

(21) Appl. No.: 16/955,622

(22) PCT Filed: Dec. 18, 2018

(86) PCT No.: PCT/GB2018/053665
§ 371 (c)(1),
(2) Date: Jun. 18, 2020

(87) PCT Pub. No.: WO2019/122853
PCT Pub. Date: Jun. 27, 2019

(65) Prior Publication Data
US 2021/0054779 A1    Feb. 25, 2021

(30) Foreign Application Priority Data

Dec. 19, 2017 (GB) ..................... 1721262

(51) Int. Cl.
*F02B 37/18* (2006.01)
*F02C 6/12* (2006.01)
*F16C 17/02* (2006.01)

(52) U.S. Cl.
CPC .............. *F02B 37/186* (2013.01); *F02C 6/12* (2013.01); *F05D 2220/40* (2013.01); *F05D 2250/411* (2013.01); *F16C 17/02* (2013.01)

(58) Field of Classification Search
CPC ........ F02B 37/183; F02B 37/186; F02C 6/12; F16C 17/02; F01D 17/105; F05D 2220/40; F05D 2250/411; Y02T 10/12
See application file for complete search history.

(56) References Cited

U.S. PATENT DOCUMENTS 5,046,317 A * 9/1991 Satokawa ............. F02B 37/025
60/602
7,644,583 B2 * 1/2010 Leavesley ............. F02B 37/183
60/602

(Continued)

FOREIGN PATENT DOCUMENTS

CN    102678196 A    9/2012
CN    102762837 A    10/2012

(Continued)

OTHER PUBLICATIONS

International Search Report and Written Opinion issued by the European Patent Office, dated Feb. 13, 2019, for International Application No. PCT/GB2018/053665; 8 pages.

(Continued)

*Primary Examiner* — Audrey B. Walter
*Assistant Examiner* — Dapinder Singh
(74) *Attorney, Agent, or Firm* — Faegre, Drinker, Biddle & Reath LLP

(57) ABSTRACT

A turbine comprises a turbine housing defining a turbine inlet upstream of a turbine wheel and a turbine outlet downstream of the turbine wheel; and a wastegate valve assembly comprising at least one movable valve member mounted on a movable support member within a wastegate chamber which communicates with the turbine inlet upstream of the turbine, and has one or more chamber outlets which communicate with an outlet of the turbine. The valve member is permitted to articulate slightly about the support member, with the amount of articulation in respective directions being limited by collisions between a respective limit point on a limit area on a rear surface of a sealing portion of the valve member and a respective limit point on limit area on a front surface of the support member.

10 Claims, 7 Drawing Sheets

(56) References Cited

U.S. PATENT DOCUMENTS

| | | | | |
|---|---|---|---|---|
| 2012/0055154 A1* | 3/2012 | Ebert | ............... | F02B 37/186 |
| | | | | 60/602 |
| 2012/0292547 A1* | 11/2012 | Kierat | ............... | F02B 37/183 |
| | | | | 251/231 |
| 2015/0147162 A1* | 5/2015 | Stilgenbauer | ......... | F02B 37/183 |
| | | | | 415/145 |
| 2017/0024807 A1 | 1/2017 | Jhamtani et al. | | |
| 2019/0003376 A1 | 1/2019 | Schawer et al. | | |

FOREIGN PATENT DOCUMENTS

| | | | |
|---|---|---|---|
| CN | 104204449 | A | 12/2014 |
| DE | 102011089777 | A1 | 6/2013 |
| DE | 102016100900 | A1 | 7/2017 |
| DE | 102016103145 | A1 | 8/2017 |
| EP | 0401615 | A1 | 12/1990 |
| WO | 2014011468 | A1 | 1/2014 |

OTHER PUBLICATIONS

International Preliminary Report on Patentability issued by the European Patent Office, dated Jun. 23, 2020, for International Application No. PCT/GB2018/053665; 6 pages.

* cited by examiner

WASTEGATE FOR TURBINE

CROSS-REFERENCE TO RELATED APPLICATIONS

The present application is a national phase filing under 35 U.S.C. § 371 of International Application No. PCT/GB2018/053665, filed on Dec. 18, 2018, which claims the benefit of priority to British Patent Application No. 1721262.2, filed with the United Kingdom Intellectual Property Office on Dec. 19, 2017, the entire disclosures of which being expressly incorporated herein by reference.

FIELD OF THE DISCLOSURE

The present disclosure relates to a turbine and in particular to a turbine having a wastegate including a wastegate assembly comprising a support member and at least one valve member. The turbine may form part of a turbocharger or power turbine.

BACKGROUND OF THE DISCLOSURE

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of the rotor to do useful work, for example, generating electrical power; and a turbocharger, which uses the rotational energy of the rotor to compress a fluid.

Turbochargers are well known turbomachines for supplying air to an inlet of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold.

The turbocharger shaft is conventionally supported by journal and thrust bearings, including appropriate lubricating systems, located within a central bearing housing connected between the turbine and compressor wheel housings.

FIG. 1 shows a schematic cross-section through a known turbocharger. The turbocharger comprises a turbine 11 joined to a compressor 12 via a central bearing housing 13. The turbine 11 comprises a turbine wheel 14 for rotation within a turbine housing 15. The turbine wheel 14 has a rotational axis 1 (in the plane of the diagram) and blades 9. Similarly, the compressor 12 comprises a compressor wheel 16 (or "impeller") which can rotate within a compressor housing 17. The compressor housing 17 defines a compressor chamber 38 which is largely filled by the compressor wheel 16, and within which the compressor wheel 16 can rotate. The turbine wheel 14 and compressor wheel 16 are mounted on opposite ends of a common turbocharger shaft 18 which extends through the central bearing housing 13. The turbocharger shaft 18 is rotatably supported by a bearing assembly in the bearing housing 13 which comprises two journal bearings 34 and 35 housed towards the turbine end and compressor end respectively of the bearing housing 13. The bearing assembly further includes a thrust bearing 36.

The turbine housing 15 has two exhaust gas inlets 19a, 19b located annularly around the turbine wheel 14, and an axial exhaust gas outlet 10. The inlets 19a, 19b are symmetrical with respect to each other in a mirror plane perpendicular to the axial direction. Note that in other known turbine housings there is only one gas inlet. In yet further turbine housings, there are two inlets, but the inlets are not symmetrical.

The compressor housing 17 has an axial air intake passage 31 and a volute 32 arranged annularly around the compressor chamber 38. The volute 32 is in gas flow communication with a compressor outlet 33. The compressor chamber 38 is connected to the volute 32 by a radially-extending diffuser space 39 (also referred to as a "diffuser") which is a gap between a radially-extending shroud surface 25 of the housing 17, and a radially extending hub surface 26 of the bearing housing 13. The diffuser 39 is rotationally symmetric about the rotational axis 1 of the shaft 18.

In use, exhaust gas is provided to the two exhaust gas inlets 19a, 19b from an exhaust manifold (also referred to as an outlet manifold) of the engine (not shown) to which the turbocharger is attached. The inlets 19a, 19b are divided by a divider wall 20 which extends radially inwardly from the radially outer wall 21 of the turbine housing 15, to a tip 22. The exhaust gas passes from the exhaust gas inlets 19a, 19b to the exhaust gas outlet 10 via a turbine wheel 14, which is rotated by the exhaust gas. The turbine wheel 14 in turn rotates the compressor wheel 16 which thereby draws intake air through the compressor inlet 31 and delivers boost air to an inlet manifold of the engine via the diffuser 39, the volute 32 and then the outlet 33.

It is known to provide the turbine housing with at least one valve-controlled bypass port in communication with a gas inlet volute and referred to as a wastegate port, to enable control of the turbocharger boost pressure and/or shaft speed. The (or each) wastegate port is the inlet of a tubular wastegate chamber, and an outlet of the wastegate chamber is in communication with the turbine output or the atmosphere. A wastegate valve (typically a poppet type valve) is provided, including a valve member which is movable within the wastegate chamber. For example, the valve member may be mounted on an arm which is rotatable about a pivot mounted to the wastegate chamber and distant from the wastegate valve.

The combination of the wastegate port, the wastegate valve and the wastegate chamber is referred to as a wastegate. The wastegate is closed by advancing the valve member to an advanced position at which it blocks the wastegate port, and thereby prevents gas entering the wastegate chamber. The wastegate valve is opened by retracting the valve member from the wastegate port to a retracted position. This allows gas from the turbine to enter the wastegate chamber through the wastegate port, then flow between the valve member and an inwardly facing surface of the wall, to the outlet of the wastegate chamber. The wastegate valve is controlled to open the wastegate port (bypass port) when the boost pressure of the fluid in the compressor outlet increases towards a pre-determined level, thus allowing at least some of the exhaust gas to bypass the turbine wheel.

An example of this is shown schematically in cross-section in FIG. 2. The gas inlet 40 communicates with the wastegate chamber 41 via a wastegate port 42. The wastegate chamber 41 contains a valve member 50 mounted on a support member 60.

The support member 60 is movable by an actuator (not shown) to move the valve member 50 between an advanced position in which it blocks the wastegate port 42, and a retracted position in which it permits fluid to pass through the wastegate port 42. The support member 60 is supported by a linkage mechanism which connects the support member to the actuator. The linkage mechanism includes a second support member (not shown) which supports the support member 60. The connection between the support member 60 and the second support member may permit a degree of articulation of the support member relative to the second support member, and for that reason the support member 60 may be referred to as a "rocker plate".

The valve member 50 has a rotational axis 51 and is viewed in cross-section perpendicular to that axis. The valve member 50 includes a sealing portion 52 which has a sealing surface 53 which can be moved to block the wastegate port 42. The valve member 50 also includes a pin portion 54. The valve member 50 is connected to the support member 60 by inserting the pin portion 54 through a circular-cylindrical aperture 61 in the support member 60, and riveting a washer 70 larger than the aperture 61 to the pin portion on the other side of the support member 60 from the sealing portion 52 of the valve member 60.

Conventionally wastegate valves are mounted on the support member in such a manner as to permit a small degree of articulation (rotation) relative to the support member. This allows the position of the wastegate valve to compensate for manufacturing tolerances, as well as for differential thermal expansion of components of the turbine, for example due to the components of the turbine being formed of different materials or being at different temperatures. However, if the wastegate valve rotates too far there is a risk that the outer edge of the sealing portion of the wastegate member would catch against the rim of the wastegate port, and perhaps be trapped there. This would mean that the wastegate port could no longer be closed, which would lead to failure of the system. Although the risk of catching could be reduced by making the valve member much wider than the wastegate port, this would mean that in the retracted position the valve member would significantly impede fluid flow through the wastegate.

In the example of FIG. 2, articulation is possible because the circular-cylindrical aperture 61 in the support member 60 is larger than the diameter of the pin portion 54, but articulation is limited by collisions between the support member 60 and an outer edge of the washer 70. The degree of articulation is conventionally controlled by controlling the axial clearance d1 between the washer 70 and the support member 60.

It is known to provide multiple wastegate ports within a single turbine. For example, in turbine housings with two gas inlets, a wastegate port may be provided for each gas inlet volute. Multiple wastegate valve members may be provided supported via a support member on a single arm, to provide controllable blockage of the respective wastegate ports. An arrangement of this kind is shown in European patent application EP 0401615. The two wastegate valve members are attached to opposite ends of an elongate support member. The centre of the support member is coupled to an arm which can be moved by an actuator. The wastegate valve members are connected to the support member by respective pin portions, which extend through respective apertures in the support member.

SUMMARY OF THE DISCLOSURE

It has been observed that a limitation of the process above is that the degree of articulation which is achieved depends on several dimensions, such as the size of the washer, the position of the washer on the pin portion, and the dimensions of the support member. Since each of these dimensions can vary according to manufacturing tolerances, cumulatively they lead to poor control of articulation.

Furthermore, the outer edge of the washer can become worn when it impacts the support member. The wear increases the degree of articulation which is possible, thereby increasing the risk of catching.

It is an object of the present disclosure to provide a new and useful turbine which obviates or mitigates disadvantages present in the prior art.

In general terms, the present disclosure proposes that the degree of articulation between a valve member and a support member which supports it is controlled by providing opposed corresponding limit areas on (i) a "rear" surface of the sealing portion of the valve member which faces towards the support member, and (ii) a "front" surface of the support member which faces a sealing portion of the valve member. The valve member and support member are arranged such that it is contact between these two limit areas which limits the articulation of the valve member.

In other words, the valve member is permitted to articulate slightly about the support member, with the amount of articulation being limited by collisions between the respective limit areas on the rear surface of the valve member and the front surface of the support member.

The limit area on the valve member encircles a pin portion of the valve member which is used to connect the valve member to the support member (that is, the limit area of the valve member surrounds the pin portion; the limit area of the valve member is not necessarily circular). The valve member can articulate in any of multiple articulation directions; for example, if the pin portion of the valve member is threaded through an aperture in the support member which has an aperture axis, then the articulation direction of the valve member relative to the support member may be in any plane transverse to the aperture axis. The amount of articulation in respective articulation directions is limited by a collision between a respective limit point on the limit area of the valve member and a respective limit point on the limit area of the support member. The limit points and the aperture axis lie in a common plane which is substantially transverse to the articulation direction.

The two limit areas may be planar. If so, in one relative angular position of the valve member and support members, the limit areas are parallel. When the valve member articulates relative to the support member, contact is made between the limit areas.

The valve member includes a central axis transverse to the surface of the sealing portion which contacts the wastegate port. The axis is typically a central axis of the pin portion of the valve member. Furthermore, the axis is typically an axis of rotational symmetry e.g. of the entire valve member or at least of the sealing portion of the valve member. This means that care does not have to be taken to control the rotational position of the valve member when it is attached to the support member. The support member and rear surface of the sealing portion are shaped such that contact between their respective limit areas is at a distance from a central axis of the valve member which is less than the distance from the axis to an outer edge of the sealing portion. It is radially outward of the connection of the pin portion of the valve member to the sealing portion. The limit area of the valve member may be substantially orthogonal to the central axis of the pin portion. The limit area of the support member may be substantially orthogonal to the central axis of the aperture in the support member through which the pin portion is threaded.

For example, at least one of the front surface of the support member and the rear surface of the sealing portion of the valve member may be provided with a ridge encircling the central axis, and upstanding from, respectively, a peripheral portion of the front surface of the support member and/or the rear surface of the sealing portion of the valve member. The peripheral portion encircles the ridge. An upper surface of the ridge constitutes the limit area of, respectively, the support member or the valve member.

The disclosure make possible more accurate control of the maximum articulation angle of the valve member relative to the support member, since the maximum articulation angle depends only on the spacing of the limit areas and their radial extent.

Furthermore, although it is still possible for wear to occur at the limit areas, the limit areas can be arranged to distribute the impact force over a larger wear area than in the known turbines described above, so that wear can be reduced, and even when it does occur, the articulation remains well controlled for longer.

Preferably the valve member further comprises a support surface which is a portion of a sphere (a "spherical" surface) which bears against a corresponding spherical support surface of the support member. The two support surfaces may have substantially the same radius of curvature so that the centres of the spheres are co-incident. Note that due to machining tolerances the radius of curvature may not be exactly identical; indeed they may be chosen to have slightly different respective radii of curvature. For example, the convex surface may be chosen to have a slightly smaller radius of curvature than the concave surface, e.g. to ensure that, even taking machining tolerances into account, its radius of curvature does not exceed that of the concave surface. The limit area of the valve member may be radially outward of (i.e. be further from the central axis of the pin portion than) the support portion of the valve member. The support surface of the valve member preferably encircles the pin portion. The support surface of the valve member is preferably between the limit area of the valve member and the pin portion of the valve member. The support surface of the valve member may be convex, whereas the support surface of the support member may be concave.

In one form the limit areas of the support member and valve member may be rotationally symmetric about respective axes defined by the support member and the valve member.

Alternatively, if the support member supports two valve members spaced apart in a separation direction, the limit areas may be formed to be mirror symmetric in a mirror plane including the separation direction, but not rotationally symmetric about respective axes defined by the support member and valve member. Thus, the articulation limit may be different in the separation direction than in a transverse direction.

In a first aspect of the disclosure there is provided a wastegate assembly for a turbine comprising: a turbine wheel; a turbine housing defining at least one gas inlet upstream of the turbine wheel and a turbine outlet downstream of the turbine wheel; and a wastegate chamber communicating with the at least one gas inlet via one or more wastegate ports;

the wastegate assembly comprising:
a support member; and
at least one valve member for blocking a corresponding wastegate port, the or each valve member being mounted on the support member via a pin portion of the valve member for articulation about the support member, having a central axis and comprising a sealing portion which extends away from the axis to an outer edge of the valve member, the sealing portion having a sealing surface transverse to the axis for blocking one of the one or more wastegate ports upon the sealing surface of the valve member being pressed against a rim of the wastegate port;

a rear surface of the sealing portion opposite to the sealing surface including an limit area of the valve member radially inward of the outer edge of the sealing portion of the valve member, the limit area of the valve member encircling the pin portion of the valve member and at each angular position about the pin portion providing a respective limit point being arranged to limit articulation of the valve member in a respective plane by colliding with a corresponding respective limit point on a limit area of the support member, the limit area of the support member being a portion of a front surface of the support member facing towards the sealing portion of the valve member.

According to a second aspect of the disclosure there is provided a turbine comprising a wastegate assembly according to the first aspect of the present disclosure.

According to a third aspect of the present disclosure there is provided a turbocharger or powerturbine including a turbine according to the second aspect of the present disclosure.

As used in this document, the expression that a first surface on a first element "faces towards" a second surface on a second element is not intended to imply that the two surfaces are exactly parallel. Rather it means that a normal direction at a first point on the first surface out of the first element insects with a second point on the second surface on the second element. The angles between the normal to the first surface at the first point, and the normal to the second surface at the second point may be up to about 60 degrees or about 40 degrees, but may be no more than 20 degrees or no more than 10 degrees.

BRIEF DESCRIPTION OF THE FIGURES

Specific embodiments of the present disclosure will now be described, by way of example only, with reference to the accompanying drawings, in which.

DETAILED DESCRIPTION OF THE EMBODIMENTS

Figure 1:
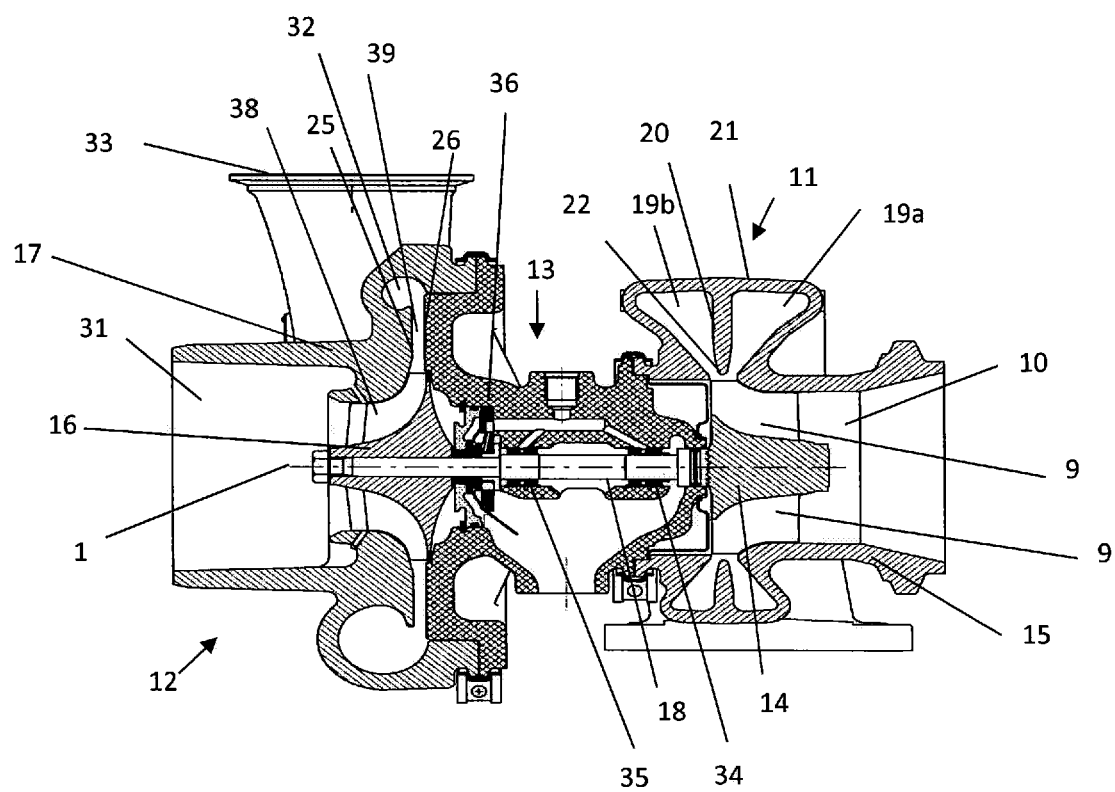
FIG. 1 shows a schematic cross-section through a portion of a known turbocharger.
Figure 2:
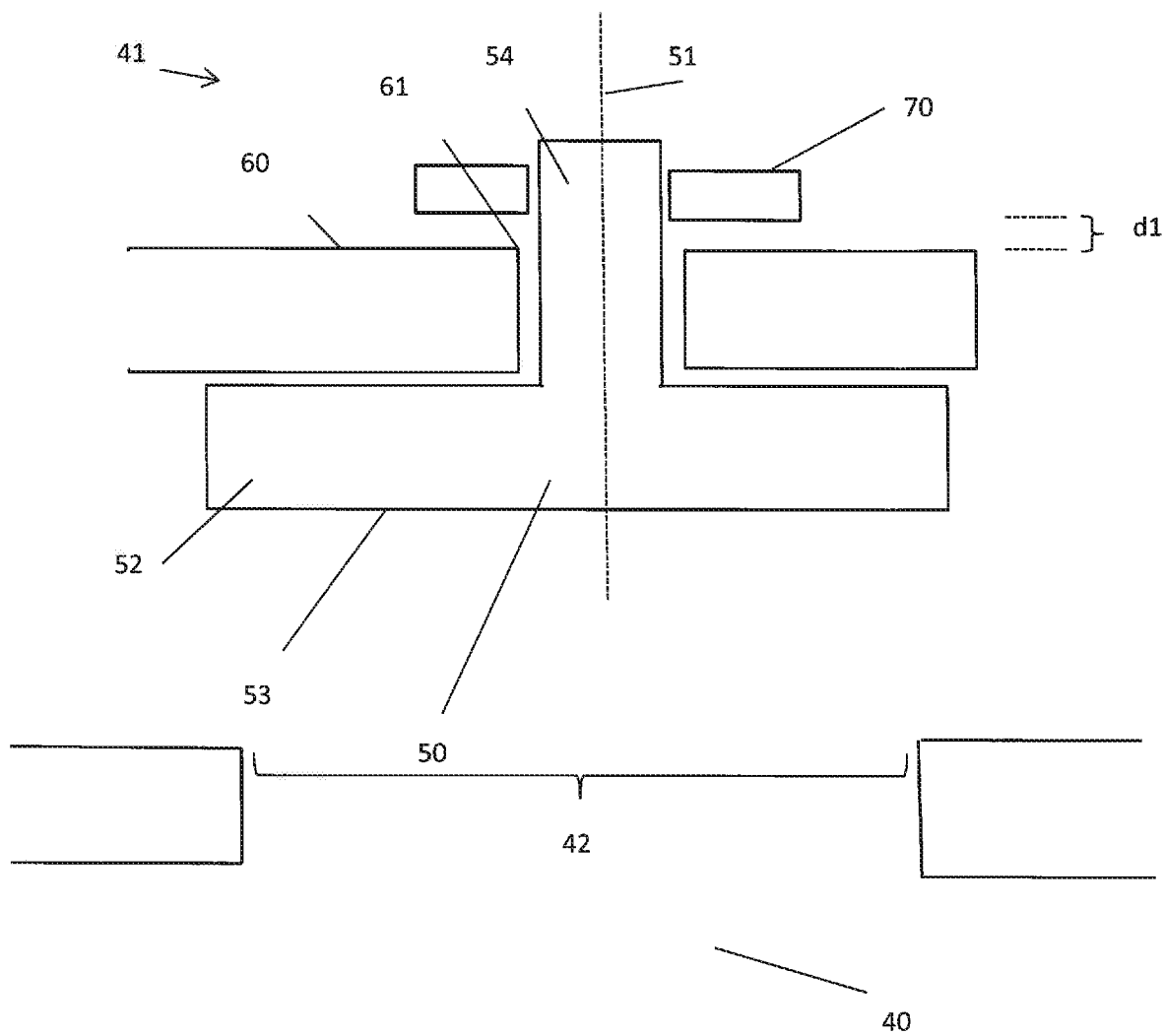
FIG. 2 shows a schematic cross-section through a wastegate of the turbine of the turbocharger of FIG. 1.
Figure 3A:
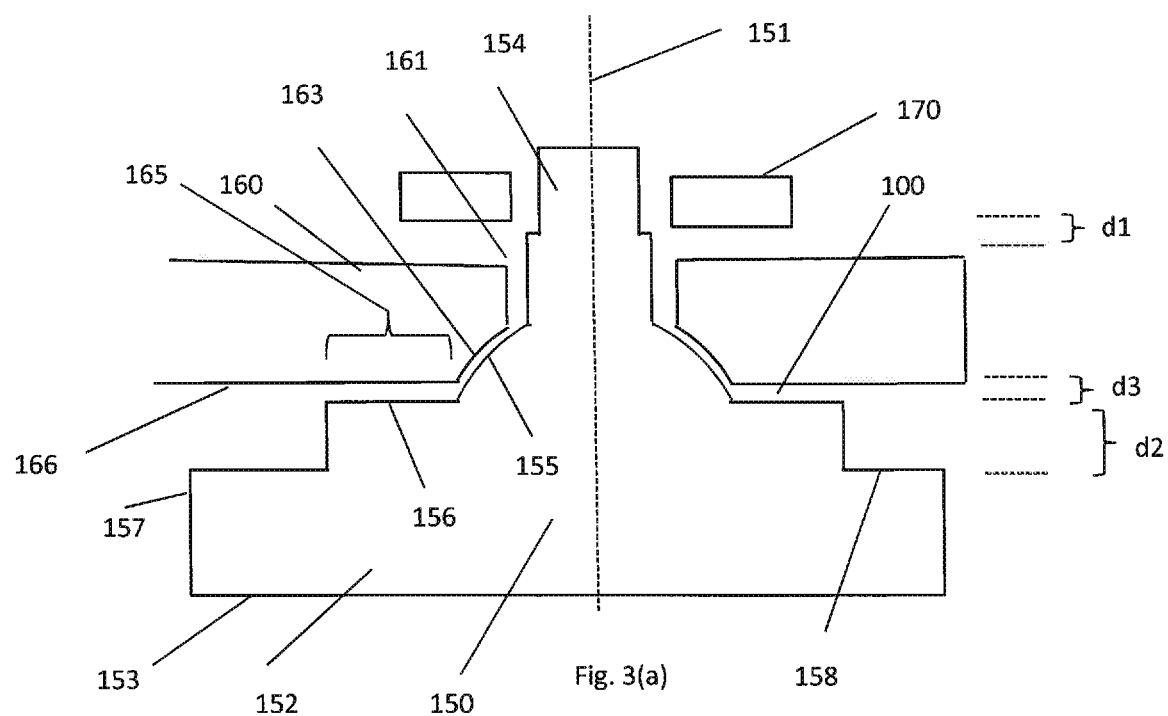
FIG. 3 is composed of FIGS. 3(a) and 3(b), which are respectively a schematic cross-sectional view and a top view, of a portion of a wastegate assembly which is a first embodiment of the disclosure.
Figure 3B:
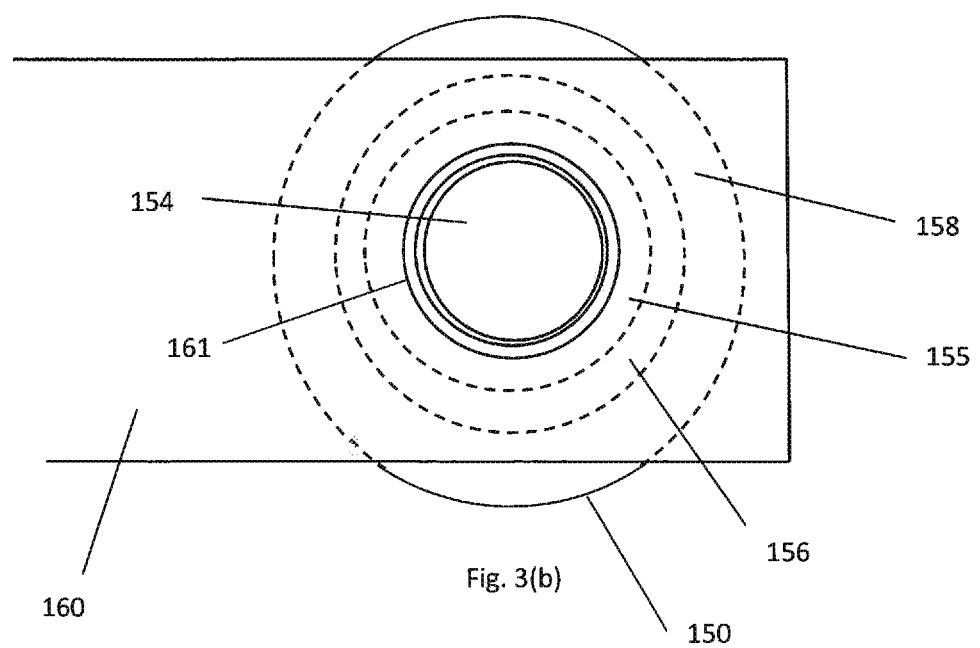
Figure 4:
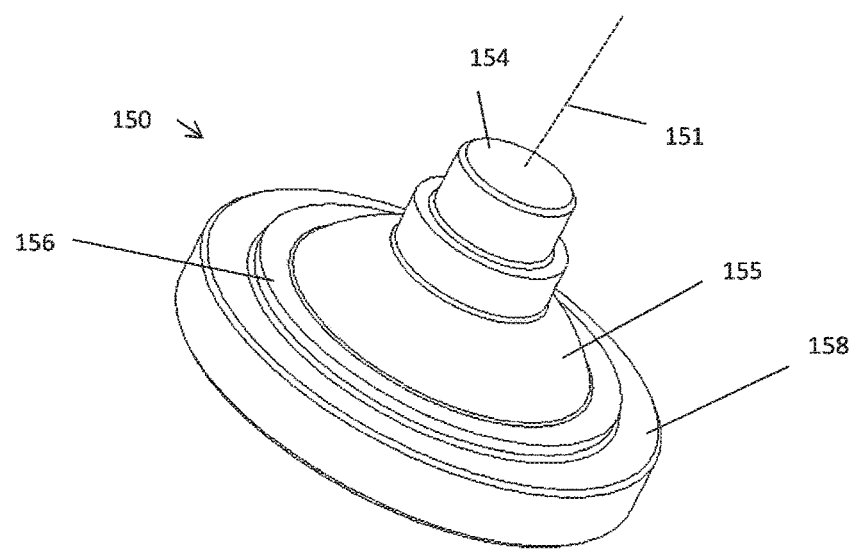
FIG. 4 is perspective view of a valve member of the wastegate assembly of FIG. 3.

Referring to FIGS. 3(a) and 3(b) and FIG. 4, a portion of a wastegate assembly which is a first embodiment of the disclosure is illustrated. FIGS. 3(a) and 3(b) are views of the portion of the wastegate assembly from two orthogonal directions, while FIG. 4 is a view of the valve member of the wastegate assembly. Elements of the first embodiment corresponding to elements of FIG. 2 are given reference numerals 100 higher. The wastegate assembly is for use in a turbine as shown in FIG. 1, and is located in a wastegate chamber communicating with the turbine outlet. The wastegate assembly includes a valve member 150 having an axis of rotational symmetry 151. The valve member 150 for sealing a wastegate port which is not shown in FIGS. 3 and 4, but which is of the same general form as shown in FIG. 2. For that purpose, the valve member has a sealing portion 152, with a planar circular sealing surface 153 which is for pressing around the whole circumference of a rim defining the wastegate port.

The valve member 150 is supported by a support member 160. The support member 160 is depicted as generally elongate, with its length direction in the right-left direction of FIGS. 3(a) and 3(b). The support member 160 may extend beyond the left edge of FIGS. 3(a) and 3(b). The support member 160 is movable by an actuator (not shown) to move the valve member 150 between an advanced position in which it blocks the wastegate port, and a retracted position in which it permits fluid to pass through the wastegate port. The support member 160 is supported by a linkage mechanism which connects the support member to the actuator. The linkage mechanism may include a second support member (not shown, but generally to the left of the portion of the wastegate assembly shown in FIGS. 3(a) and 3(b)) which supports the support member 160. The connection between the support member 160 and the second support member may permit a degree of articulation of the support member relative to the second support member. The support member 160 may thus be a rocker plate.

The valve member 150 further includes a pin portion 154, which is inserted through a (typically) circular-cylindrical aperture 161 in the support member 160. The aperture 161 defines a central axis, and FIG. 3(b) is looking along this central axis. A washer 170 is attached (riveted) to the pin portion 154 on the opposite side of the support member 160 from the sealing portion 152 of the valve member 150. The spacing of the washer 170 from the support member 160 is denoted by d1. Since the valve member 150 has rotational symmetry about the axis 151, it is not necessary to select and/or maintain the rotational position of the valve member 150 about the axis 151 at this time. Note that during the riveting operation, the pin portion 154 may be deformed, such that it no longer has rotational symmetry about its central axis 151, although the sealing portion 152 still has rotational symmetry about central axis 151.

The valve member 150 includes a convex spherical (more exactly, frusto-spherical) support surface 155. The support surface 155 encircles the pin portion 154, and rests against a corresponding concave spherical (i.e. frusto-spherical) support surface 163 having substantially the same radius of curvature (or possibly a slightly greater radius of curvature). In FIG. 3(a) the support surfaces 155, 163 are illustrated as being separated, but in reality they are typically touching. Relative sliding motion of the support surfaces 155, 163 provides articulation of the valve member 150 relative to the support member 160 about the common centre of curvature of the support surfaces 155, 163.

The "rear" surface of the sealing portion 152 facing away from the sealing surface 153 is formed with a substantially planar limit area 156, transverse to the axis 151. The support surface 155 is between the pin portion 154 and the limit area 156, and contacts each of them along a respective circular line. Encircling the limit area 156, and parallel to it, is a planar peripheral surface 158, which spaces the limit area 156 radially from the outer edge 157 of the sealing portion 152 of the valve member 150. The limit area 156 is displaced in the direction along the axis 151 from the peripheral surface 158 by a step of height d2.

The limit area 156 of the valve member 150 faces a corresponding limit area 165 on the support member 160. As illustrated in FIG. 3(a) the limit area 165 is simply a portion of a flat front surface 166 of the support member 160 which faces generally towards the sealing portion 152 of the valve member 150, and thus towards wastegate port. The valve member 150 and support member 160 are illustrated in FIG. 3(a) in a configuration in which the limit areas 156, 165 are parallel with a gap 100 between them. In this case, they are spaced apart by a distance denoted by d3. Note that every point on the limit area 156 of the valve member is spaced by the distance d3 from a corresponding point on the limit area 165 of the support member. That is, the limit area 165 of the support member extends over the whole of the limit area 156 of the valve member.

The distances d1, d2 and d3 are chosen such that the limit to the articulation range is collisions between the limit areas 156, 165. That is, d3 and d1 are sufficiently great in relation to d2 that, as the axis 151 rotates relative to the support member 160 from the position shown in FIG. 3(a) due to sliding motion between the support surfaces 155, 163, the limit areas 156, 165 collide before the washer 170 or the surface 158 collide with the support member 160. It is easy to ensure that d3 and d1 are this large, and provided it is true, the only dimension which needs to be controlled to control accurately the maximum articulation angle is the dimension d2. d2 can be controlled with high accuracy by accurate casting/machining of the valve member 150 and support member 160. The respective points on the limit areas 156, 165 which collide are referred to as "limit points", and depend upon the articulation direction (i.e. the direction of the axis around which the axis 151 rotates). Specifically, the respective collision points are at the outer periphery of the limit areas 156, 165, and in the plane which includes the axis 151 and which is transverse to the rotational direction (i.e. transverse to the axis around which the axis 151 rotates).

Specifically, the articulation allows the central axis 151 of the valve member 150 to rotate in any articulation direction by up to an articulation limit angle relative to the central axis of the aperture 161. The articulation limit angle may be in the range 2 degrees to 15 degrees, or more preferably 3 degrees to 10 degrees. When the valve member 51 articulates by the limit angle, the gap 100 closes at corresponding limit points of each of the limit areas 156, 165 (i.e. the respective limit points collide).

As illustrated in FIG. 3(b), the peripheral surface 158 extends beyond the support member 160 in certain directions away from the axis 151 (i.e. in the directions towards the top and bottom of FIG. 3(b)). However, as noted above, the limit area 165 of the support member 160 extends over the whole of the limit area 156 of the valve member 150, so the limit to the articulation is circularly symmetric in all directions about the axis 151, i.e. the same for all directions in which the axis 151 of the valve member 150 can pivot away from the central axis of the aperture 161 about the common centre of curvature of the support surfaces 155, 163. Thus, the offset in the axial position of the limit area 156 and the peripheral surface 158 means that a circularly symmetric articulation limit can be provided without ensuring that the support member 160 extends in all directions about the axis 151 to the points of the sealing portion 152 furthest from the axis 151.

The force of impacts between the limit areas 165, 156 can be spread across a part of those surfaces near where they impact, and this reduces the wear on the limit areas compared to the known wastegate assembly described above. This in turn means that the control of the degree of articulation remains high over time. Note that in a variation of the embodiment, the surfaces 156, 165 may be made non-planar (e.g. both might be frusto-conical, i.e. portions of respective cones; the cones might have a shared apex point at the centre of curvature of the spherical surfaces 155, 163) to spread the impact force more widely.

Figure 5:
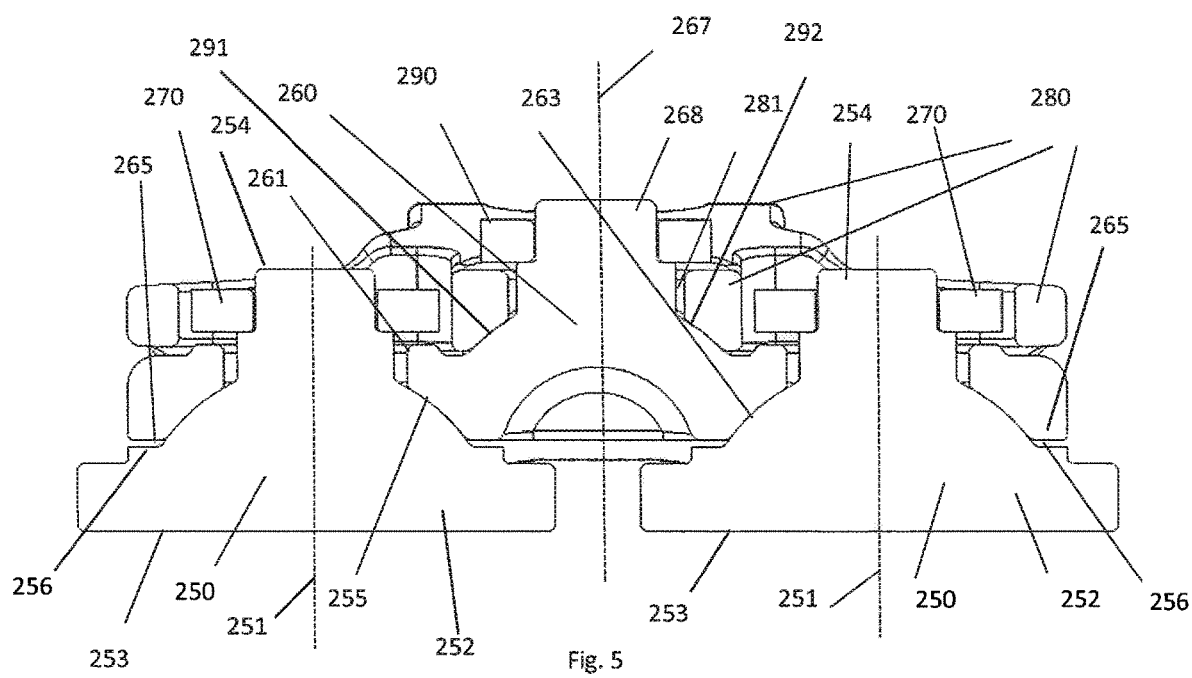
FIG. 5 is a cross-sectional view of a portion of wastegate assembly which is a second embodiment of the disclosure.

Turning to FIG. 5, a wastegate assembly which is a second embodiment is illustrated in cross-section. The wastegate assembly is located in a wastegate chamber which is in communication via two wastegate ports (not shown) with at least one gas inlets (e.g. with the two wastegate ports communicating with two respective gas inlets). In this case, the wastegate assembly includes two wastegate valves 250, each of which is identical to the wastegate valve 150 shown in FIG. 4, and includes a rotational axis of symmetry 251. Each of the wastegate valves 250 includes a sealing portion 252 which defines a sealing surface 253, and a pin portion 254 extending along the respective axis 251. The sealing surfaces 253 of the valve members 250 are for pressing against the respective wastegate ports.

Each of the valve members 250 is supported by a support member 260, which has a plane of mirror symmetry which is transverse to the plane of FIG. 5, and which intersects with the plane of FIG. 5 along the line 267. The support member defines two circular apertures 261, and a respective pin portion 254 of each of the valve members is inserted through a respective one of the apertures 261, and connected to a respective washer 270 (e.g. by riveting).

A limit area 256 on each of the valve members 250 faces and is covered by a respective planar limit area 265 of the support member 260. The valve members 250 include convex spherical surfaces 255, between the respective limit areas 256 and the respective pin portion 254. The convex spherical surfaces 255 are support surfaces which make sliding contact with respective concave spherical surfaces 263 of the support member 260 with substantially the same radius of curvature (or possibly a slightly greater radius of curvature), thus allowing articulation in the same manner as in the first embodiment as the support surfaces 255, 263 slide against each other.

The degree of allowable articulation is limited by impact between the limit areas 256, 265. Since the rotationally-symmetric limit areas 256 of the valve members 250 are covered by the limit areas 265 of the support member 260, the maximum articulation angle is rotationally-symmetric, i.e. the same for all directions in which the axes 251 of the valve members 250 can pivot away from the central axis of the aperture 261 about the centre of curvature of the support surfaces 255, 263.

The support member 260 is itself supported by connection to a second support member 280. The support member 260 includes a pin portion 268 which is inserted into an aperture 281 defined by the second support member 280, and a washer 290 is attached (riveted) to the pin portion 268 to retain the pin portion 268 in this position relative to the second support member 280. An interface between the support member 260 and the second support member 280 is provided by a convex spherical surface 291 of the support member 260 which bears against a concave spherical surface 292 of the support member 280. The spherical surfaces 291, 292 may have substantially the same radius of curvature (e.g. the spherical surface 292 may have very slightly greater radius of curvature than the spherical surface 291). The aperture 281 is sufficiently larger than a circumference of the pin portion 268 that the support member 260 is able to articulate about the support member 280, by the spherical surface 291 sliding against the spherical surface 292. The second support member 280 is movable by an actuator (not shown) to advance the sealing surfaces 253 to press against the respective wastegate ports, or to withdraw the sealing surfaces 253 from the respective wastegate ports to allow fluid to flow through them into the wastegate chamber.

Figure 6:
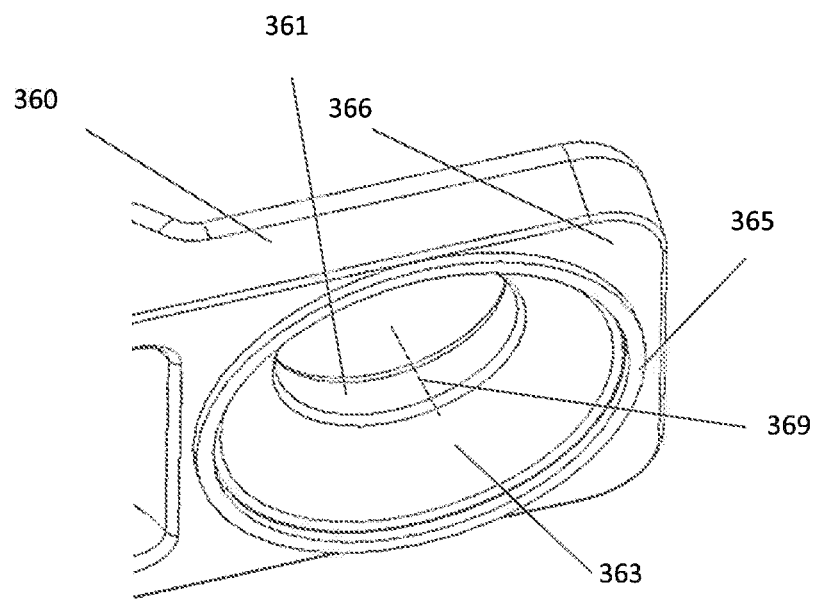
FIG. 6 is a perspective view of a support member of a wastegate assembly which is a third embodiment of the disclosure.
Figure 7:
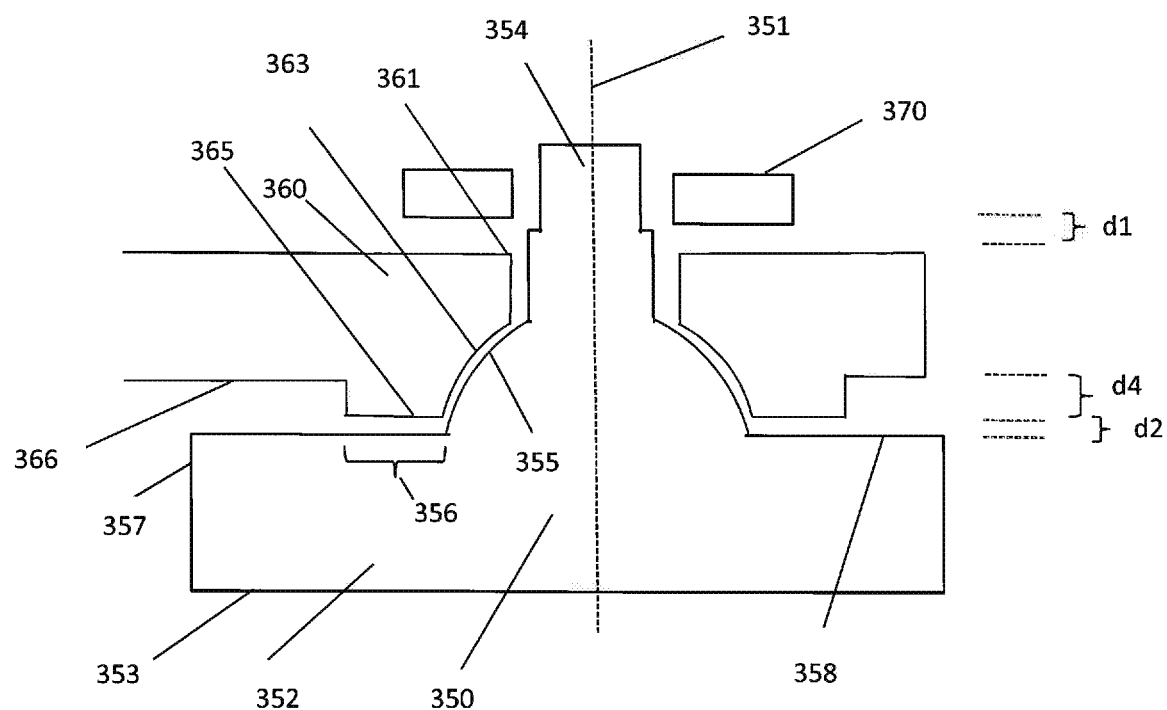
FIG. 7 is a schematic cross-sectional view of the wastegate assembly of FIG. 6.

Turning to FIG. 6, a support member 360 is illustrated which can be used in a wastegate assembly which is a third embodiment of the disclosure and which is illustrated in schematic cross-section in FIG. 7. Elements of FIGS. 6 and 7 having a meaning corresponding to respective elements of FIG. 3 are given reference numerals 200 higher.

The support member 360 is elongate, and one end is shown in FIG. 6, defining a circular-cylindrical aperture 361 for receiving the pin portion 354 of a valve member 350. The aperture 361 has a central axis 369. A washer 370 is then attached (riveted) to the pin portion 354. Note that another end of the support member 360 (not shown in either FIG. 6 or 7) may define a further circular aperture for receiving the pin portion of another valve member, so that the support member 360 carries two valve members for pressing against two respective wastegate ports in the same manner as the support member 260 of FIG. 5.

As in the first and second embodiments, the valve member 350 has a sealing portion 352 extending from an axis 351 of rotational symmetry to an outer edge 357. The support member 360 and valve member 350 can relatively articulate by sliding movement between a concave spherical support surface 363 of the support member 360, and a convex spherical support surface 355 of the valve member 350. The support surfaces 355, 363 have substantially the same radius of curvature, so that they fit together with the support surfaces 355, 363 centred on a point which lies on the axis 351 and the central axis 369 of the aperture 361.

In contrast to the support members 160, 260, the support member 360 is formed with a planar limit area 365 on a rim upstanding by a height d4 from, and encircled by, a planar surface 366 of the support member 360. The rim is rotationally symmetric about the axis 369. Support member 360 might be formed by fine blanking, or by casting, especially by investment casting.

The limit area 365 of the support member 360 faces towards, and is completely covered by a limit area 356 of the valve member 350 which is just a portion of the planar rear surface 358 of the sealing portion 352 of the valve member 350 on the side opposite the sealing surface 353. When the axes 351, 369 are co-incident and the surfaces 355, 363 are tight against each other (not slightly separated as shown in FIG. 7 for clarity), the limit areas 356, 365 are co-planar, and a distance d2 apart. The washer 370 is spaced from the support member 360 by a distance d1. The distances d1, d2 and d4 are selected such that articulation is limited by collisions between the limit areas 356, 365. Thus the range of articulation is determined solely by the distance d2 which is relatively easy to control accurately. The limit area 365 of the support member 360 is completely covered by the limit area 356, so that the articulation limit is circularly symmetric about the axis 351.

Figure 8:
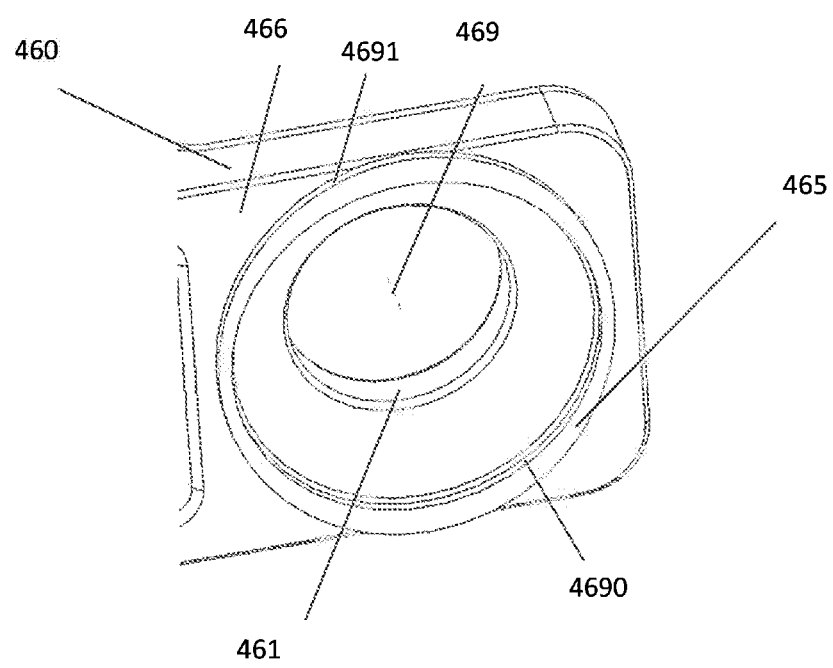
FIG. 8 is a perspective view of a support member of a wastegate assembly which is a fourth embodiment of the disclosure.

By contrast, a support member 460 for a wastegate assembly which is a fourth embodiment of the disclosure is illustrated in FIG. 8. The only difference between the support member 460 and the support member 360 is that the limit area 465 of the support member 460 which is upstanding from the planar surface 466 is non-circularly symmetric about the axis 469 of the aperture 461 defined by the support member 460. Instead, the limit area 465 extends between a circular-cylindrical inner face 4690 and an elliptical-cylindrical outer face 4691. The long axis of the ellipse is in the length direction of the support. Note that it is the position of the outer edge 4691 which, for a given value of d2, defines the articulation limit. This means that the articulation limit is different in the direction parallel to the length direction of the elongate support member, to that in the width direction of the elongate support member (i.e. the direction which is transverse both to the axis 469 and the length direction of the elongate support member). This asymmetry may be useful if the support member is supporting two valve members spaced apart by the length direction of the elongate support member, and which are to be used to cover two respective wastegate ports which are spaced apart by a direction which, when they are blocked by the respective valve members, is parallel to the length direction of the support member 460.

Several variants of this embodiment are possible within the scope of the disclosure. Firstly, in a variant, the short axis of the ellipse (rather than the long axis) may be parallel to the length direction of the support.

Figure 10:
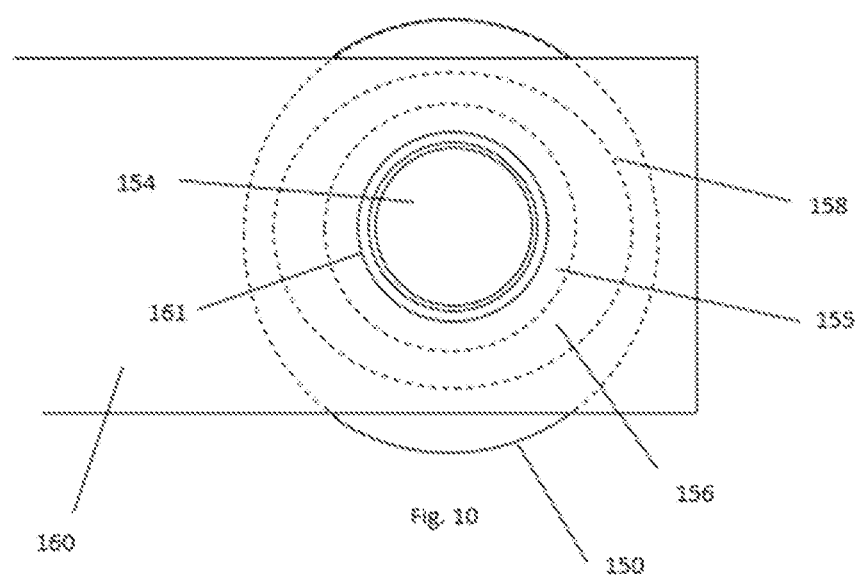
FIG. 10 is a top view of a portion of a wastegate assembly which is an alternative embodiment of that shown in FIG. 3(b).

Alternatively or additionally, in an arrangement such as that of FIG. 3 (in which the limit area 156 of the valve member 150 is a surface of valve member 150 which is spaced from a peripheral surface 158 of the valve member in a direction parallel to the axis 151), the limit area may be arrange to lack circular symmetry about a central axis of a pin portion of the valve member. That is, the limit area of the valve member may be a non-circular surface of the valve member, spaced from the rest of the rear surface of the valve member, such as parallel to an axis of a pin portion of the valve member. For example, the limit area of the valve member may have an outer circumference which is an ellipse, e.g. with its long axis traverse to or parallel to a length direction of a support member supporting the valve member such as depicted in FIG. 10.

Figure 9:
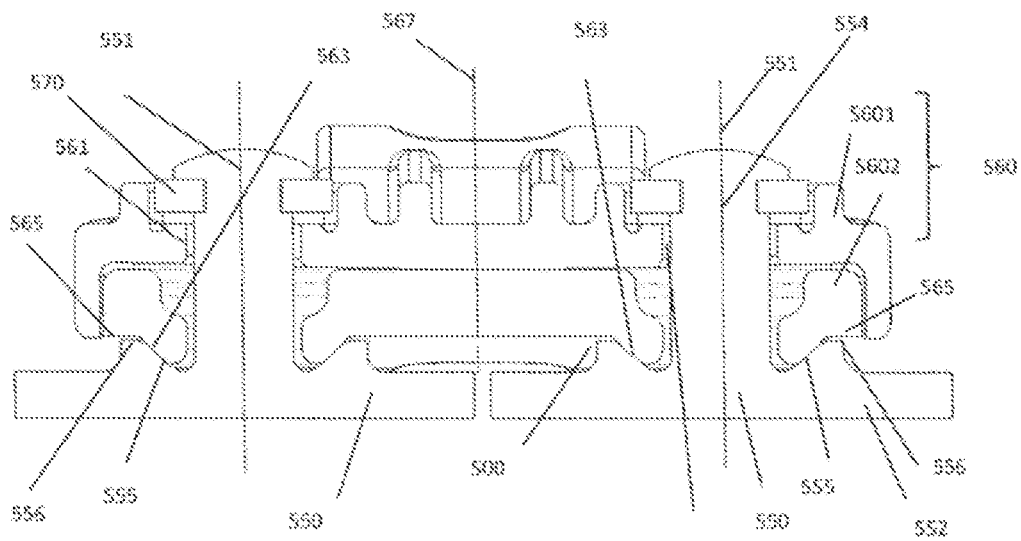
FIG. 9 shows a portion of a wastegate assembly which is a fifth embodiment of the disclosure.

FIG. 9 shows a portion of a wastegate assembly which is a fifth embodiment of the disclosure. Elements corresponding to elements of FIG. 5 are given reference numerals 300 higher. This embodiment differs from the embodiment of FIG. 5 in that the support member 560 is not a one-piece unit, but is instead composed of a first support member element 5601 which is attached via a linkage mechanism to an actuator, and a second support member element 5602 which is supported by the first support member element 5601 but which is able to move within a cavity defined by the first support member element 5601. FIG. 5 shows a configuration in which respective length directions of the the support member elements 5601, 5602 are parallel, such that the entire support member 560 has a plane of mirror symmetry 567.

The two valve members 550 are supported from the support member 560 via respective pin portions 554 of the valve members 550 which pass through respective apertures 561 in the support member elements, and are then connected by riveting to respective washers 570 which retain the distal end of the pin portions 554 on the opposite side of the support member 560 from sealing portions 552 of the valve members 550. Each of the valve members 550 includes a central axis 551, which may be an axis of rotational symmetry of the valve member 550. The apertures 561 are circular-cylindrical, defining respective axes. As depicted in FIG. 9, the axes of the apertures 561 are co-incident with the axes 551 of the respective valve members 550.

Each support surface 563 of the support member 560 is formed in this case as a convex spherical surface, on a front surface of the support member element 5602. The support surfaces 555 of the valve members 550 are formed as concave spherical surfaces having substantially the same radius of curvature as the support surfaces 563 of the support member 560. Due to sliding motion between the support surfaces 555, 563, the valve member 550 can articulate relative to the support member element 5602. In all articulation positions, the centre of rotation of the support surfaces 555, 563 is a point where the axis 551 of the valve member 550 intersects with the central axis of the aperture 561.

Articulation of the valve members 550 with respect to the support member element 5602 is limited by respective circular limit areas 556 on the valve members 550, and corresponding limit areas 565 on the support member element 5602. A gap 500 exists between the corresponding limit areas 556, 565. Specifically, the articulation allows the central axis 551 of each valve member 550 to rotate in any articulation direction up to a maximum articulation angle to the central axis of the corresponding aperture 561. The maximum articulation angle may be in the range 2 degrees to 15 degrees, or more preferably 3 degrees to 10 degrees. When the valve member has articulated by the maximum articulation angle, the gap 500 between the corresponding limit areas 556, 565 closes at corresponding limit points on each of the limit areas 556, 565 (i.e. the respective limit points collide).

It is to be appreciated that numerous modifications to the above-described embodiments may be made without departing from the scope of the disclosure as defined in the appended claims. For example, in the embodiments explained above only one of the limit area of the valve member, and the limit area of the support member, is axially spaced from a peripheral surface of the valve member or support member respectively. However, in a variation, both limit areas may be axially spaced from peripheral portions of, respectively, the support member and the valve member which encircle them. For example, a valve member as shown in FIG. 4 may be used in conjunction with a support member as shown in FIG. 6 or FIG. 8.

Although the previous description is related to embodiments of a turbine according to the present disclosure which forms part of a turbocharger, it will be appreciated that a turbine according to the present disclosure may form part of any appropriate turbomachine. For example, a turbine according to the present disclosure may form part of a turbomachine which does not include a compressor. In particular, a turbine according to the present disclosure may form part of a power turbine, for example a power turbine which converts the rotation of a turbine wheel into electrical power.

Although the above described embodiments relate to a turbine which operates in conjunction with gas, it will be appreciated that turbines according to the present disclosure may operate in conjunction with any appropriate fluid, for example a liquid.

The invention claimed is:

1. A wastegate assembly for a turbine comprising: a turbine wheel; a turbine housing defining at least one gas inlet upstream of the turbine wheel and a turbine outlet downstream of the turbine wheel; and a wastegate chamber communicating with the at least one gas inlet via one or more wastegate ports;

the wastegate assembly comprising:

a support member; and at least one valve member for blocking a corresponding wastegate port, the at least one valve member being mounted on the support member via a pin portion of the valve member for articulation about the support member, having a central axis and comprising a sealing portion which extends away from the axis to an outer edge of the valve member, the sealing portion having a sealing surface transverse to the axis for blocking one of the one or more wastegate ports upon the sealing surface of the valve member being pressed against a rim of the wastegate port;

a rear surface of the sealing portion opposite to the sealing surface including a limit area of the valve member radially inward of the outer edge of the sealing portion of the valve member, the limit area of the valve member encircling the pin portion of the valve member, being rotationally symmetric about the central axis, wherein the central axis of the valve member is an axis of the pin portion of the valve member, and at each angular position about the pin portion providing a respective limit point being arranged to limit articulation of the valve member in a respective plane by colliding with a corresponding respective limit point on a limit area of the support member, the limit area of the support member being a portion of a front surface of the support member facing towards the sealing portion of the valve member the at least one valve member further comprising a support surface between the pin portion and the limit area of the valve member, the support surface bearing against a corresponding support surface of the support member, the two support surfaces being portions of respective spheres.

2. The wastegate assembly according to claim 1 in which the limit area of the at least one valve member is substantially planar.

3. The wastegate assembly according to claim 1 in which the at least one valve member includes the pin portion which is inserted into a corresponding aperture of the support member.

4. The wastegate assembly according to claim 1 in which the support surface of the at least one valve member is convex, and the corresponding support surface of the support member is concave.

5. The wastegate assembly according to claim 1 in which the limit area of the at least one valve member is axially spaced in a direction towards the support member from a peripheral portion of the rear surface of the valve member, the peripheral portion of the rear surface of the valve member encircling the limit area of the rear surface of the valve member.

6. The wastegate assembly according to claim 1 in which the limit area of the support member is upstanding from a peripheral portion of the front surface of the support member, the peripheral portion of the front surface of the support member encircling the limit area of the support member and facing towards the sealing portion of the valve member.

7. The wastegate assembly according to claim 1, in which the limit area of the support member is rotationally symmetric about a second axis, whereby the degree of limitation of the articulation from a position in which the central axis and second axis are coincident, is rotationally symmetric about the axes.

8. The wastegate assembly according to claim 1, in which there are two valve members, spaced apart on the support member in a separation direction, the valve members being for blocking respective said wastegate ports.

9. A turbine including: a turbine wheel; a turbine housing defining at least one gas inlet upstream of the turbine wheel and a turbine outlet downstream of the turbine wheel; a wastegate chamber communicating with the at least one gas inlet via one or more wastegate ports; a wastegate assembly; and an actuator operative to move the wastegate assembly between an advanced position in which the wastegate assembly obstructs the one or more wastegate ports, and a retracted position in which the wastegate assembly permits fluid flow through the wastegate ports;

the wastegate assembly comprising:

a support member; and at least one valve member for blocking a corresponding wastegate port, the at least one valve member being mounted on the support member via a pin portion of the valve member for articulation about the support member, having a central axis and comprising a sealing portion which extends away from the axis to an outer edge of the valve member, the sealing portion having a sealing surface transverse to the axis for blocking one of the one or more wastegate ports upon the sealing surface of the valve member being pressed against a rim of the wastegate port;

a rear surface of the sealing portion opposite to the sealing surface including a limit area of the valve member radially inward of the outer edge of the sealing portion of the valve member, the limit area of the valve member encircling the pin portion of the valve member, being rotationally symmetric about the central axis, wherein the central axis of the valve member is an axis of the pin portion of the valve member and at each angular position about the pin portion providing a respective limit point being arranged to limit articulation of the valve member in a respective plane by colliding with a corresponding respective limit point on a limit area of the support member, the limit area of the support member being a portion of a front surface of the support member facing towards the sealing portion of the valve member the at least one valve member further comprising a support surface between the pin portion and the limit area of the valve member, the support surface bearing against a corresponding support surface of the support member, the two support surfaces being portions of respective spheres.

10. A turbocharger or powerturbine including a turbine, the turbine including: a turbine wheel; a turbine housing defining at least one gas inlet upstream of the turbine wheel and a turbine outlet downstream of the turbine wheel; a wastegate chamber communicating with the at least one gas inlet via one or more wastegate ports; a wastegate assembly; and an actuator operative to move the wastegate assembly between an advanced position in which the wastegate assembly obstructs the one or more wastegate ports, and a retracted position in which the wastegate assembly permits fluid flow through the wastegate ports;

the wastegate assembly comprising:

a support member; and at least one valve member for blocking a corresponding wastegate port, the at least one valve member being mounted on the support member via a pin portion of the valve member for articulation about the support member, having a central axis and comprising a sealing portion which extends away from the axis to an outer edge of the valve member, the sealing portion having a sealing surface transverse to the axis for blocking one of the one or more wastegate ports upon the sealing surface of the valve member being pressed against a rim of the wastegate port;

a rear surface of the sealing portion opposite to the sealing surface including a limit area of the valve member radially inward of the outer edge of the sealing portion of the valve member, the limit area of the valve member encircling the pin portion of the valve member, being rotationally symmetric about the central axis, wherein the central axis of the valve member is an axis of the pin portion of the valve member and at each angular position about the pin portion providing a respective limit point being arranged to limit articulation of the valve member in a respective plane by colliding with a corresponding respective limit point on a limit area of the support member, the limit area of the support member being a portion of a front surface of the support member facing towards the sealing portion of the valve member the at least one valve member further comprising a support surface between the pin portion and the limit area of the valve member, the support surface bearing against a corresponding support surface of the support member, the two support surfaces being portions of respective spheres.

* * * * *